Aug. 9, 1938.                    K. MIKIMOTO                    2,126,024
                        PRODUCTION OF CULTURE PEARLS
                            Filed April 5, 1937
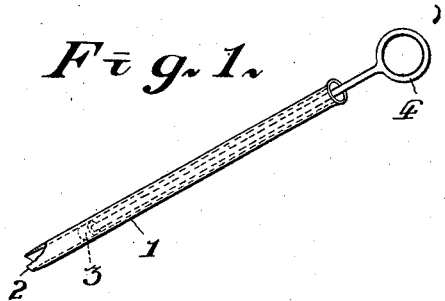
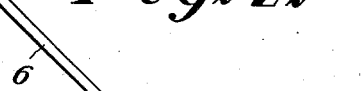
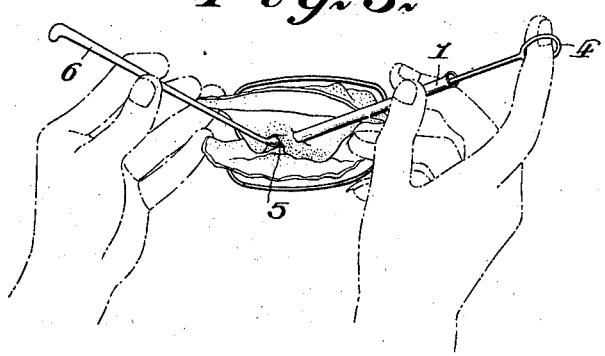
INVENTOR:
K. Mikimoto
BY
Glascock Downing Seebold
ATTORNEY.

Patented Aug. 9, 1938

2,126,024

UNITED STATES PATENT OFFICE 2,126,024

PRODUCTION OF CULTURE PEARLS

Kokichi Mikimoto, Ginza, Kyobashi-ku, Tokyo-shi, Japan

Application April 5, 1937, Serial No. 135,203

1 Claim. (Cl. 119—4)

This invention relates to improvements in the production of culture pearls; and comprises a method consisting of taking off a very small piece of the mantle with epithelium of a living pearl oyster, inserting the same into the body of the living pearl oyster from which said small piece of the mantle is taken, or other living pearl oyster and injecting a liquid including a soluble calcium salt and vitamin D into the body, and has for its object to produce excellent culture pearls bearing a close resemblance to natural pearls in the short period of a year by promoting the production of concentric layers of pearl arranged round a central nucleus of a small piece of the mantle with epithelium used.

In the accompanying drawing:

Fig. 1 is a perspective view of a mantle piece cutting and inserting apparatus, partly in section.

Fig. 2 is an elevation of a tool to be used in co-operation with the mantle piece cutting and inserting apparatus.

Fig. 3 is a view illustrating a manner for inserting a small piece of the mantle with epithelium of pearl oyster into the body thereof.

Referring now to the drawing, the mantle piece cutting and inserting apparatus comprises a tube 1 with a cutter end 2 of suitable material, and a piston 3 with a handle 4, movable in the tube, as shown in Fig. 1 and the tool comprises a spoon-shaped member 5 with a handle 6, as shown in Fig. 2.

In my method, a small piece of a certain size of the mantle with epithelium of a living pearl oyster is cut off, by inserting the spoon-shaped member 5 of the tool under the part of the mantle to be cut off and by vertically applying and pressing the cutter end 2 of said apparatus on the part of the mantle to be cut off to co-operate with the spoon member 5, the piston 3 previously being moved to a suitable extent away from the cutter end 2 by means of the handle 4. Then the small piece of the mantle with epithelium which is cut off and held by the apparatus is inserted into a suitable portion of the living pearl oyster from which the small piece of the mantle is cut off, or other living pearl oyster, by pushing forward the piston 3 by means of the handle 4, in such a manner as shown in Fig. 3, and then a liquid including a soluble calcium salt such as calcium chloride and vitamin D is injected into the body of the animal of the pearl oyster. If provitamin D, such as ergosterine is used, it may be changed to vitamin D by exposing to ultra-violet rays before injection with the calcium salt.

Pearl oysters thus treated are kept in a basket suspended in sea water as usual, and then pearls will be formed owing to the inserted small piece of the mantle with epithelium and the formation will be promoted owing to the injected liquid including a soluble calcium salt and vitamin D. The injection of a liquid including a soluble calcium salt and vitamin D may be given occasionally when the basket containing pearl oysters is pulled up out of water for inspection and scraping off deleterious matters such as sea-weeds and barnacles which hinder complete development or growth of the pearl-oysters. According to the method, so excellent pearls as be substantially indistinguishable from the natural pearls can be obtained.

I claim:

A method of producing culture pearls bearing a close resemblance to natural pearls which consists in cutting off a small piece of the mantle with epithelium of a living pearl oyster, inserting said small piece into the body of a living pearl oyster; injecting a liquid containing a soluble calcium salt and vitamin D into the body and culturing the treated pearl oyster in sea water.

KOKICHI MIKIMOTO.